United States Patent Office

3,442,661
Patented May 6, 1969

3,442,661
PRESERVING FISH WITH AMMONIA
Fern W. Mitchell, Washington, D.C., assignor to W. R. Grace & Co., New York, N.Y., a corporation of Connecticut
No Drawing. Filed Jan. 16, 1967, Ser. No. 609,337
Int. Cl. A23b *3/12*
U.S. Cl. 99—160　　　　　　　　　　　　　　3 Claims

ABSTRACT OF THE DISCLOSURE

A method of preserving fish by treatment with ammonia. An amount of ammonia equal to or greater than 0.1% by weight of the fish is sprayed over the fish, and the fish stored successfully for periods up to 2 weeks without refrigeration.

---

This invention relates to the process of preserving freshly caught fish. In summary, this invention relates to the preservation of fish by treatment with ammonia in amounts greater than 0.1% by weight of the fish.

Prior to this invention, it has been customary for fishermen to return to port from very short trips. In the case of longer fishing trips at sea, such as those for halibut fishing, it is not practicable to return to port promptly because of the great distance of the fishing ground from the port, so that a certain percentage of the fish decomposes, and is wasted, thus decreasing the profit of the trip. Also, in many parts of the world, large catches of good edible fish become available in short seasons. When facilities for cold storage are inadequate, major parts of the catch are not used effectively, since spoilage is extensive.

In the prior art, fish have been packed in ice. In certain instances this method of preservation is undoubtedly satisfactory but it is still far removed from an ideal preservative in that the mild degree of chilling merely slows down the rate of deterioration but does not arrest it. Additionally, lower temperatures are often used but this requires refrigeration equipment which is bulky and expensive.

Another approach to the solution of the problem in the prior art has been the use of certain chemical preservatives, such as formaldehyde, sodium chloride, sodium nitrite, sodium hydroxide and various other organic and inorganic preservatives. These preservatives all change the nature of fish drastically. Formaldehyde denaturizes the protein in the fish; sodium nitrite softens the flesh, as well as having toxic properties, necessitating careful washing of the fish. Sodium chloride pickles the fish, changing the taste and dehydrating the flesh. Sodium hydroxide pickles the fish, changing the taste and dehydrating the flesh. Sodium hydroxide gelatinizes the tissues, as well as hastening decomposition.

Ammonia has also been proposed for use as a fish preservative. However, this process as practiced, requires that fish be first eviscerated, immersed in ammonia solution, and enclosed in an air-tight storage compartment under a concentrated ammonia atmosphere. Clearly, evisceration is a formidable deterrent to many small fishing vessels, especially when a catch contains many small fish, such as anchovies. For instance, a small fishing vessel is one whose capacity is 100 to 200 tons. At an average weight of 30 grams per anchovy, literally millions of fish are stored; if evisceration is required to preserve each fish, it is much cheaper to take the spoilage loss.

It is noted that it is well-known in the art that evisceration tends to prevent decomposition of the fish, even wihout preservatives. This is due to the removal of the stomach and gut enzymes having rapid digestive activity. The eviscerated fish has none of these enzymes present, and clearly will not decompose as fast as a fish which is not eviscerated. It is a matter of common knowledge that whole fish are observed to initiate rapid decomposition in the gut area.

Besides the purely practical impossibility of requiring evisceration of a fish catch, as noted above, many end-uses of the fish require the use of the whole fish.

It is a further object of my invention to provide a simple economical, and effective means of preserving whole fish.

It is a furthe robject of my invention to provide a means of preserving fish that will be economically feasible to even the smallest individual fishing vessel by obviating the need for evisceration.

It is a still further object of this invention to provide a means for preserving fish without toughening, softening, the flesh or adversely affecting the quality of the fish.

Other objects of the invention will become apparent from the following description and appended claims.

I have now found, that, when using ammonia for a fish preservative, the weight of ammonia used in relation to the weight of the fish must be closely controlled. When there is 0.1 to 1% by weight ammonia used to treat the fish, no evisceration is required to keep the fish in good condition for a reasonable length of time. Preferably, I use about 0.3–1% by weight ammonia.

It must also be noted in connection with the preservation of fish by a basic agent that I prefer to use only ammonia. For instance, when an equivalent amount of sodium hydroxide is used, the fish decays rapidly after 2–3 hours. This effect of a strong base is probably due to hydrolysis of the amide linkages in the amino acid constituents of fish protein.

When the procedure of my invention is followed, the fish are sprayed with the preferred amount of ammonia, and then stored normally in the ship's hold or fishbox without further treatment or special equipment.

The following discussion illustrates the procedure of my invention:

The weight of freshly caught fish is estimated, and about 1% by weight of anhydrous ammonia is sprayed over the fish preferably in an enclosed space, i.e., below deck. The fish are then kept in the hold or fishbox, and are preserved for about 2 weeks or more. At the end of this time, the fish are in excellent condition: firm, yet not tough or gelatinized. The treated fish were not soft and needed no further treatment to restore firmness to the flesh. This shows particularly the criticality of the amount of ammonia used: when greater quantities of ammonia are used with whole (non-eviscerated) fish, the fish become soft, and remain soft even after being washed.

After storage treatment according to my invention, the fish are removed and, for many purposes, such as the manufacture of fishmeal, may immediately be used without further treatment. However, for fish of the finest quality, with no taste or residue of ammonia discernible, they may be washed with water or seawater. The thus-preserved fish can then be processed by ordinary means into fish meal, fish protein concentrate or other high protein fish products.

The following table illustrates the advantages of my invention. The fish are freshly caught achoveta, 8 to 10 cm. long, about 30 gms. each in weight. They were placed in containers and treated with the indicated preservatives. The ammonia used was anhydrous ammonia, although aqueous solutions of ammonia could be used if the weight percent of ammonia used per weight of fish is as indicated. After 48 hours, the liquid was drained off, and enough water was added to cover the fish. After stirring the liquid containing the soluble and finely divided portions of the fish was drained off and the residue weighed.

TABLE I

| Treatment: | Residue, wt. percent |
|---|---|
| 1% NH$_3$ | 86 |
| 0.3% NH$_3$ | 77 |
| 200 p.p.m. formaldehyde | 69 |
| 400 p.p.m. sodium nitrite | 62 |
| Control (untreated fish) | 64 |

By comparison, non-eviscerated fish treated with about 1% ammonia and then placed in an air-tight container over 2 N ammonia solution, in a concentrated ammonia atmosphere had a weight residue of 70%, using the above procedure.

Having fully described my invention, what is claimed is:

1. The process of preserving fresh, whole, uneviscerated fish which comprises treating with between 0.1 and 1 weight percent of ammonia based on the fish weight.
2. The process of claim 1 in which the ammonia used is anhydrous ammonia.
3. The process of claim 2 in which 1 weight percent ammonia is used, based on weight of fish.

References Cited

UNITED STATES PATENTS 2,987,404   6/1961   Beckmann _____ 99—195

A. LOUIS MONACELL, *Primary Examiner.*

R. M. ELLIOTT, *Assistant Examiner.*